(12) United States Patent
Kirby et al.

(10) Patent No.: US 11,788,940 B2
(45) Date of Patent: Oct. 17, 2023

(54) APPARATUS AND METHOD FOR MATERIAL TESTING INCLUDING CONFIGURING AN ELECTRICAL MACHINE IN A BRAKING CONFIGURATION

(71) Applicant: Illinois Tool Works Inc., Glenview, IL (US)

(72) Inventors: Andrew Kirby, High Wycombe (GB); Graham Mead, Oxford (GB); Edward Dempsey, Guildford (GB)

(73) Assignee: Illinois Tool Works Inc., Glenview, IL (US)

( * ) Notice: Subject to any disclaimer, the term of this patent is extended or adjusted under 35 U.S.C. 154(b) by 26 days.

(21) Appl. No.: 17/483,447

(22) Filed: Sep. 23, 2021

(65) Prior Publication Data

US 2022/0091000 A1   Mar. 24, 2022

(30) Foreign Application Priority Data

Sep. 24, 2020  (GB) ..................... 2015113

(51) Int. Cl.
*G01N 3/02*  (2006.01)
*G01N 3/32*  (2006.01)
*G01N 3/08*  (2006.01)
*G01N 3/04*  (2006.01)

(52) U.S. Cl.
CPC .......... *G01N 3/02* (2013.01); *G01N 3/32* (2013.01); *G01N 2203/0005* (2013.01); *G01N 2203/0423* (2013.01)

(58) Field of Classification Search
CPC .... G01N 3/02; G01N 3/32; G01N 2203/0005; G01N 2203/0423; G01N 2203/003; G01N 2203/0202; G01N 2203/04; B25J 19/00; B60R 16/03; B60L 3/04; B60K 6/46;
(Continued)

(56) References Cited

U.S. PATENT DOCUMENTS

| 2013/0055823 | A1* | 3/2013 | Kawano | G01N 3/08 73/805 |
| 2020/0173893 | A1* | 6/2020 | Peterson | G01N 3/08 |
| 2020/0173895 | A1* | 6/2020 | Pope | G01N 3/06 |

FOREIGN PATENT DOCUMENTS

WO   2020113179   6/2020

OTHER PUBLICATIONS

Search Report for GB2015113.0, dated Feb. 17, 2021 (3 pages).

* cited by examiner

*Primary Examiner* — Brandi N Hopkins
(74) *Attorney, Agent, or Firm* — McAndrews, Held & Malloy, Ltd.

(57) ABSTRACT

An example material testing apparatus includes: guide means; sample test means for holding a sample and applying a test force to the sample; a crosshead arranged to support at least a portion the sample test means, wherein the crosshead is moveable about the guide means; crosshead drive means for moving the crosshead generally vertically about the guide means, wherein the crosshead drive means is driven by an electric machine in a driving configuration; and a controller arranged to: configure the electric machine into the driving configuration; control the crosshead drive means to move the crosshead generally vertically about the guide means; and configure the electric machine into a braking configuration, wherein in the braking configuration a winding of the electric machine is connected together with a low resistance connection.

14 Claims, 7 Drawing Sheets

(58) Field of Classification Search
CPC .......... H02H 7/085; H02J 7/0031; H02J 3/28; B29C 45/7666; B60G 13/14; F28D 20/00
See application file for complete search history.

APPARATUS AND METHOD FOR MATERIAL TESTING INCLUDING CONFIGURING AN ELECTRICAL MACHINE IN A BRAKING CONFIGURATION

RELATED APPLICATIONS

The present application claims the benefit of United Kingdom (GB) Patent Application No. 2015113.0, filed Sep. 24, 2020, entitled "APPARATUS AND METHOD FOR MATERIAL TESTING." The entirety of United Kingdom (GB) Patent Application No. 2015113.0 is expressly incorporated herein by reference.

FIELD OF THE DISCLOSURE

This invention relates to apparatus and methods for material testing.

BACKGROUND

Material testing machines (also sometimes known as structural tests machines) are used to test the physical characteristics of a material sample. Material testing machines use a sample test means to hold the material sample and apply a test force to the material sample. The sample test means is supported by a crosshead which clamps to a guide. The location of the crosshead is controlled using crosshead drive means which raises and lowers the crosshead.

However, as testing machines are developed that are capable of applying larger forces to samples, the mass that must be supported by the crosshead also increases. Therefore, there is a need for material testing machines which enable the crosshead drive means to safely move the increased mass supported by the crosshead into position on the guide and to secure the crosshead to the guide.

It is an object of the present invention to mitigate at least some of the above problems.

BRIEF SUMMARY OF THE DISCLOSURE

In accordance with the present inventions there is provided a material testing apparatus, comprising: guide means; sample test means for holding a sample and applying a test force to the sample; a crosshead arranged to support at least a portion the sample test means, wherein the crosshead is moveable about the guide means; crosshead drive means for moving the crosshead generally vertically about the guide means, wherein the crosshead drive means is driven by an electric machine in a driving configuration; and a controller arranged to: configure the electric machine into the driving configuration; control the crosshead drive means to move the crosshead generally vertically about the guide means; and configure the electric machine into a braking configuration, wherein in the braking configuration a winding of the electric machine is connected together with a low resistance connection.

Optionally, the controller is arranged to configure the electric machine into the braking configuration after controlling the crosshead drive means to vertically move the crosshead.

In some embodiments, the controller may be arranged to configure the electric machine into the braking configuration immediately after controlling the crosshead drive means to complete vertical movement of the crosshead.

Optionally, that apparatus may include one or both of: in the braking configuration, the low resistance connection may comprise connecting a winding of the electric machine through a connection of substantially zero resistance; and the controller may configure the electric machine into the driving configuration or the braking configuration by controlling a switching device.

In some embodiments, the crosshead drive means may comprise a driving mechanism arranged to cause generally linear motion of the crosshead vertically with respect to the guide means.

Optionally, the driving mechanism arranged to cause linear motion of the crosshead about the guide means comprises a ball screw mechanism arranged cause the linear motion of the crosshead about the guide means.

Optionally, the apparatus may comprise electric clamping means configured to apply a releasable clamping force to the guide means to secure the crosshead at a location with respect to the guide means and wherein the controller may be arranged to control the electric clamping means to apply the clamping force.

In some embodiments, the controller may be arranged to configure the electric machine into the braking configuration after controlling the crosshead drive means to vertically move the crosshead prior to applying the clamping force to the guide means.

According to an embodiment of the invention, there is a provided a material testing apparatus, comprising: guide means; sample test means for holding a sample and applying a test force to the sample; a crosshead arranged to support at least a portion of the sample test means, wherein the crosshead is moveable about the guide means; electric clamping means configured to apply a releasable clamping force to the guide means to secure the crosshead at a location with respect to the guide means, wherein the electric clamping means is driven by an electric machine in a clamping configuration; and a controller arranged to: configure the electric clamping means into the clamping configuration; control the electric clamping means to apply the clamping force to the guide means; and configure the electric machine into a braking configuration, wherein in the braking configuration a winding of the electric machine is connected together with a low resistance connection.

Optionally, the controller may be arranged to configure the electric machine into the braking configuration when the clamping force is applied to the guide means.

In some embodiments, the controller may be arranged to configure the electric machine into the braking configuration immediately after the clamping force is applied.

In some embodiments, one or both of: in the braking configuration, the low resistance connection comprises connecting a winding of the electric machine through a connection of substantially zero resistance; or the controller configures the electric machine into the clamping configuration or the braking configuration by controlling a switching device.

According to an embodiment of the present invention, there is provided a method of operating a material testing apparatus, wherein the material testing apparatus comprises: guide means, sample test means for holding a sample and applying a test force to the sample, a crosshead arranged to support at least a portion of the sample test means, wherein the crosshead is moveable about the guide means, crosshead drive means for moving the crosshead generally vertically about the guide means, wherein the crosshead drive means is driven by an electric machine in a driving configuration; and wherein the method comprises: configuring the electric machine into the driving configuration; controlling the crosshead drive means to move the crosshead generally vertically about the guide means; vertically moving the crosshead about the guide means using the electric machine; configuring the electric machine into a braking configuration, wherein in the braking configuration a winding of the electric machine is connected together with a low resistance connection.

According to an embodiment of the present invention, there is provided a method of operating a material testing apparatus, wherein the material testing apparatus comprises: guide means, sample test means for holding a sample and applying a test force to the sample, a crosshead arranged to support at least a portion of the sample test means, wherein the crosshead is moveable about the guide means, electric clamping means configured to apply a releasable clamping force to the guide means to secure the crosshead at a location with respect to the guide means, wherein the electric clamping means is driven by an electric machine in a clamping configuration; and wherein the method comprises: configuring the electric machine into the clamping configuration; controlling the electric clamping means to apply the clamping force; applying the clamping force, using the electric clamping means, to the guide means to secure the crosshead at a location with respect to the guide means; configuring the electric machine into a braking configuration, wherein in the braking configuration a winding of the electric machine is connected together with a low resistance connection.

According to an embodiment of the present invention, there is provided computer software which, when executed, is arranged to perform a method according to any method above.

BRIEF DESCRIPTION OF THE DRAWINGS

Embodiments of the invention are further described hereinafter with reference to the accompanying drawings, in which.

DETAILED DESCRIPTION

Throughout this application, references to "sample" are intended to refer to a specimen, such as a material specimen for testing. The specimen may be a piece of material which is placed into a material testing machine to be tested. The material testing machine may exert a force on the specimen to the test various physical properties of the material of the specimen. The specimen may be, for example, taken from a production process of the material as a sample of the material being produced.

Figure 1:
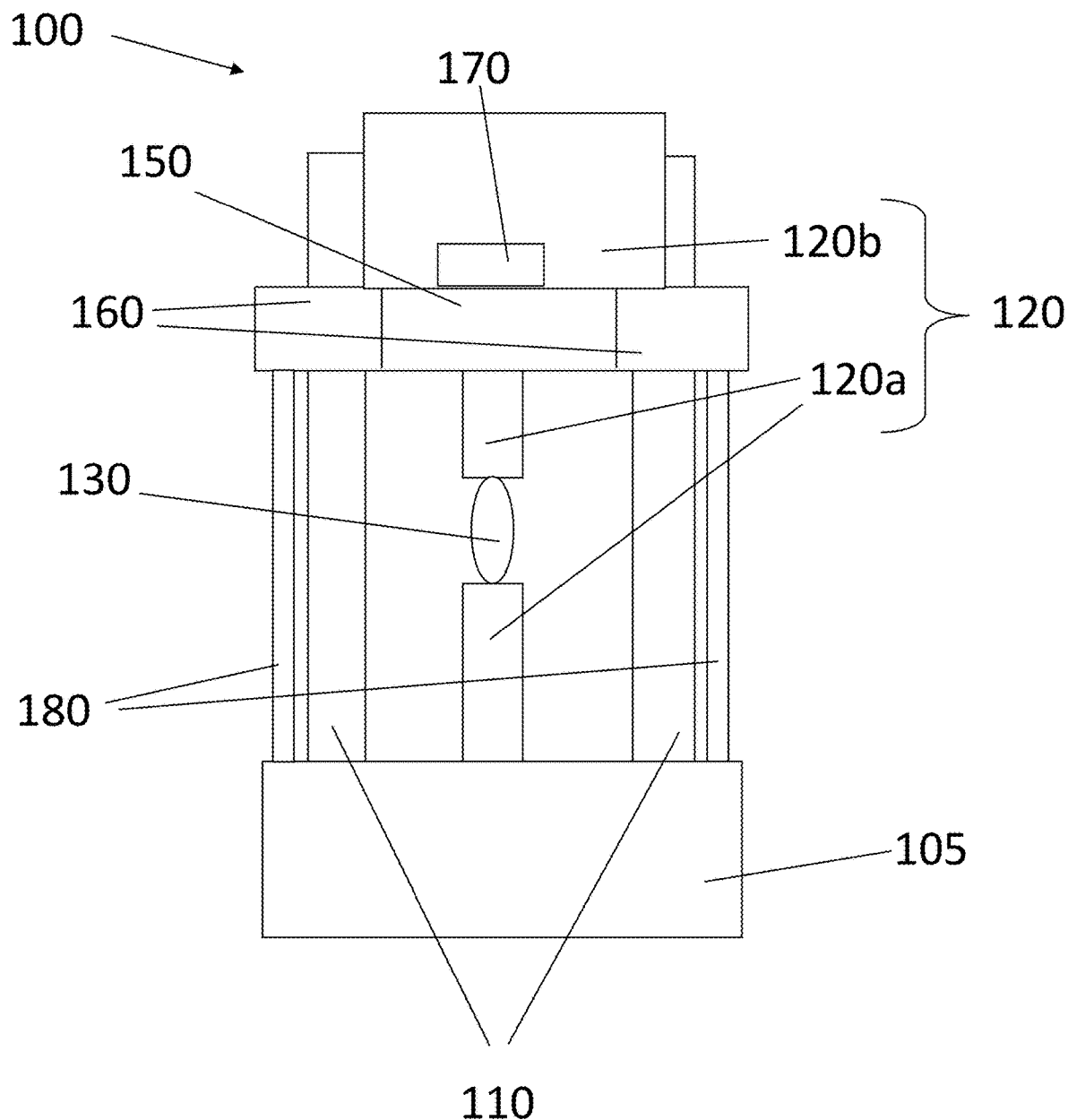
FIG. 1 is an apparatus according to an embodiment of the present invention.

FIG. 1 illustrates a material testing apparatus according to an embodiment of the present invention, indicated generally by reference numeral 100. The material testing apparatus 100 may be configured to perform a method according to an embodiment of the invention as described below in relation to FIG. 6. The material testing apparatus for testing a sample 130 comprises guide means 110, a crosshead 150 and crosshead drive means 180.

The guide means 110 may be a guide arranged to support the crosshead 150 and guide a movement of the crosshead 150 about the guide 110. The guide 110 may be supported by a base 105 of the material testing apparatus 100. In the embodiment illustrated in FIG. 1, the guide 110 comprises two stanchions, laterally separated by less than a width of the crosshead 150 which extend vertically from the base 105. It will be appreciated that the guide 110 may be configured according to force requirements and/or a shape and size of the material testing apparatus 100. For example, the guide 110 may comprise one stanchion. Each guide in the illustrated embodiment has a generally circular lateral cross-section although it will be appreciated that other cross-sectional shapes of the guide means may be envisaged.

The crosshead 150 is moveable about the guide 110. For example, the crosshead 150 is moveable about the guide 110 via translational movement. In the embodiment in FIG. 1, the crosshead 150 is arranged to vertically move along the two stanchions of the guide 110 using translational movement. The crosshead 150 is arranged to move vertically in first and second opposed directions about the guide 110, which relates to up and down directions along the guide 110.

The crosshead drive means 180 may be a crosshead drive mechanism. The crosshead drive mechanism 180 is for moving the crosshead 150 generally vertically about the guide 110. The movement of the crosshead 150 vertically about the guide 110 may be referred to as a crosshead drive operation. The crosshead drive mechanism 180 may comprise a combination of electrical and mechanical components arranged in such a way as to move the crosshead 150 vertically about the guide 110, as shown in FIGS. 3 and 4.

The crosshead drive mechanism 180 may be user controlled. That is, the crosshead drive mechanism 180 may move the crosshead 150 vertically about the guide 110 without manual application of a force to raise or lower the crosshead 150 but may require user interaction to control whether the crosshead drive mechanism 180 raises or lowers the crosshead 150. In other embodiments, the crosshead drive mechanism 180 may automatically raise or lower the crosshead 150 in order to accommodate the sample 130 but may require a user input to initiate the crosshead drive operation. For example, a user may be required to provide an input such as to push a button to initiate the crosshead drive operation.

Figure 3A:
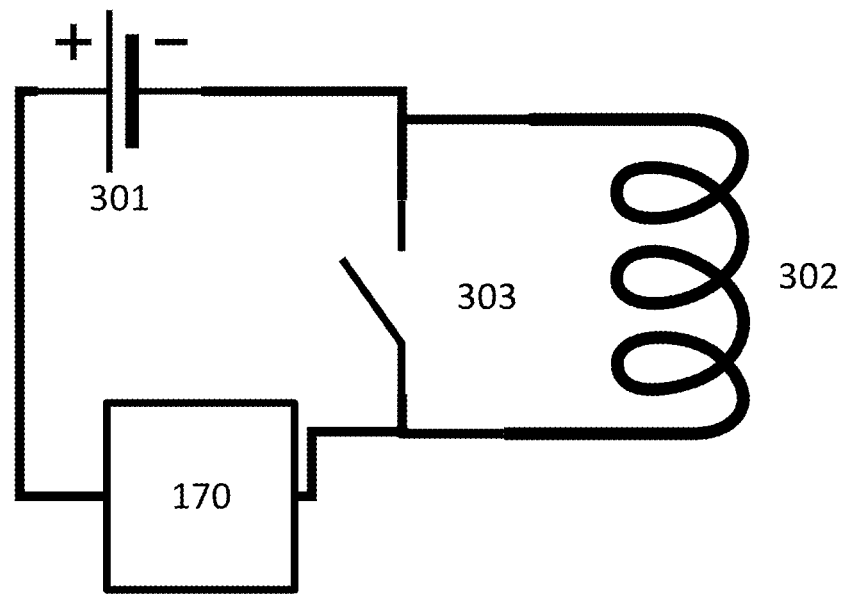
FIGS. 3a and 3b illustrate a schematic according to an embodiment of the present invention.
Figure 3B:
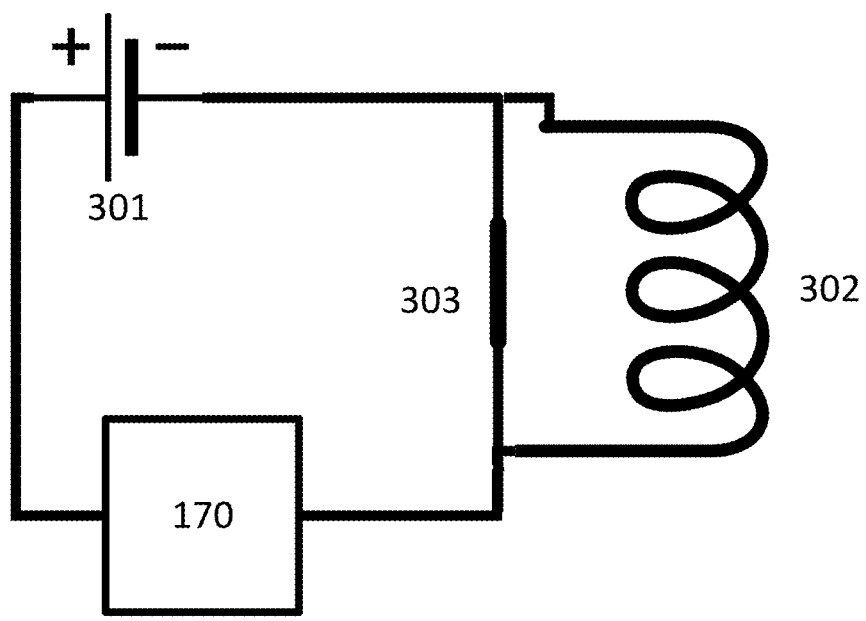
Figure 4:
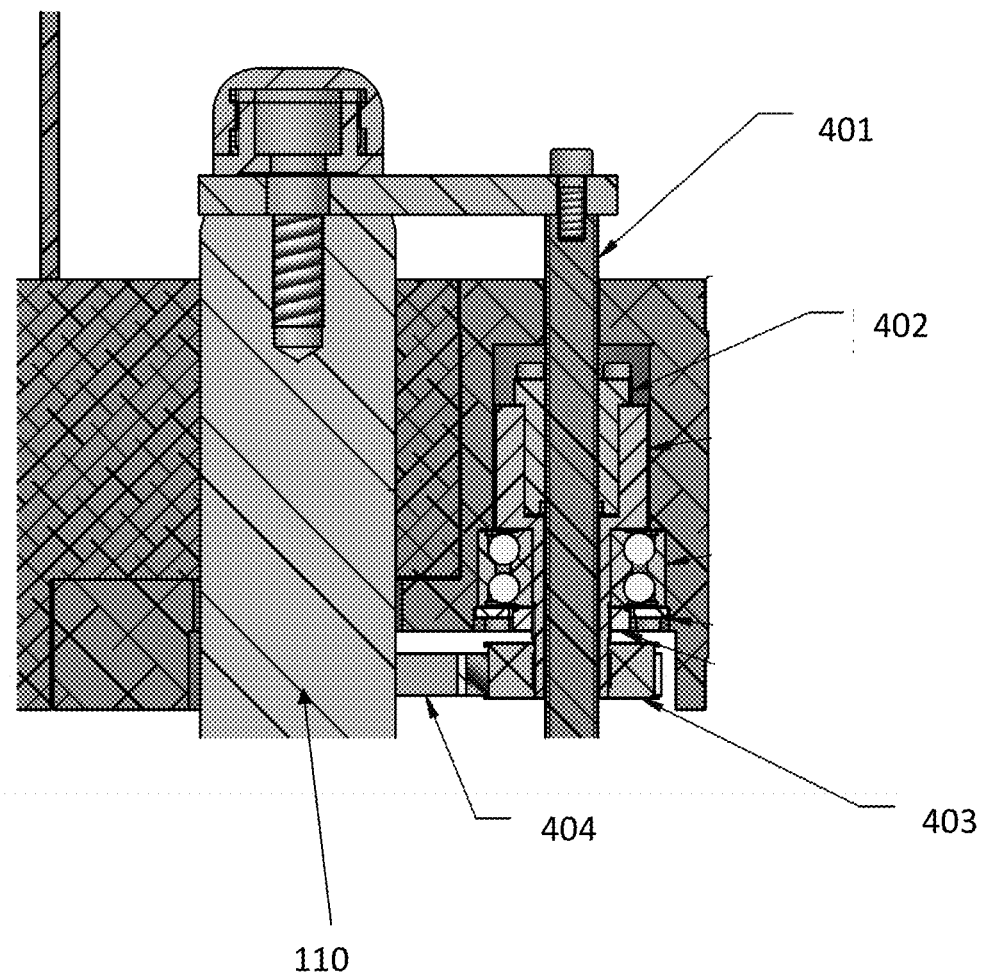
FIG. 4 illustrates a cross section of a crosshead drive means according to an embodiment of the present invention.

The crosshead drive mechanism 180 comprises an electric machine 302 comprising at least one winding as illustrated in FIGS. 3a and 3b. FIGS. 3a and 3b also illustrate a switching device 303, a power supply 301 and a controller 170. The electric machine 302 may be supported on the crosshead 150 or located within the base 105.

The electric machine 302 is capable of being configured into at least two different electrical configurations using the switching device 303. In particular, the electric machine 302 is capable of being configured into a driving configuration illustrated in FIG. 3a and a braking configuration illustrated in FIG. 3b. The switching device 303 may be a relay switch or a solid-state switch such as one or more FETs for example.

The crosshead drive mechanism 180 is driven by the electric machine 302 in the driving configuration. The driving configuration refers to a circuit arrangement which provides power to the electric machine 302 to cause the electric machine 302 to operate as a motor to provide torque to actively drive the crosshead 150 vertically about the guide 110, via a raising or lowering of the crosshead 150. In the driving configuration, the switching device 303 is open which causes electrical current to flow through the at least one winding.

The crosshead 150 may be driven vertically about the guide 110 via a ball screw mechanism which is described below in relation to FIG. 4. Advantageously, the ball screw mechanism is able to support a heavier load than other mechanisms which convert rotational motion to linear motion, such as lead screw mechanisms. This enables the crosshead drive mechanism 180 to move the crosshead 150 even when the crosshead 150 is supporting a heavy load.

However, when the crosshead 150 is not being actively driven by the crosshead drive mechanism 180, the heavy load of the crosshead 150 may cause the crosshead 150 to move downwards about the guide 110 under gravity. As a result, there is a possibility that backdrive will occur, in which the electric machine 302 is rotated by the downwards motion of the crosshead 150 and self-energises, which causes the downwards motion of the crosshead 150 to continue. This is uncontrolled motion of the crosshead 150 which could cause harm to the user of the material testing apparatus 100 or damage to the sample 130.

In order to reduce the possibility of backdrive occurring, the electric machine 302 is configured into the braking configuration 302. The braking configuration refers to a configuration in which the at least one winding of the electric machine 302 is electrically connected together with a low resistance, for example by using the switching device 303. In the braking configuration, the switching device 303 is closed which causes electrical current to flow through the closed switching device 303 instead of the at least one winding. That is, the at least one winding is connected to form a low resistance circuit.

The low resistance connection of the winding of the electric machine of the crosshead drive mechanism 180 may comprise connecting at least one winding of the electric machine through a connection of substantially zero resistance. It will be appreciated that the shorting the winding of the electric machine is an intentional and controlled shorting whilst the winding is not energised.

Although the ball screw mechanism has been used as an example embodiment, it will be appreciated that other mechanical arrangements for driving the crosshead 150 may be envisaged in which the present invention may be applied to prevent backdrive.

Figure 2:
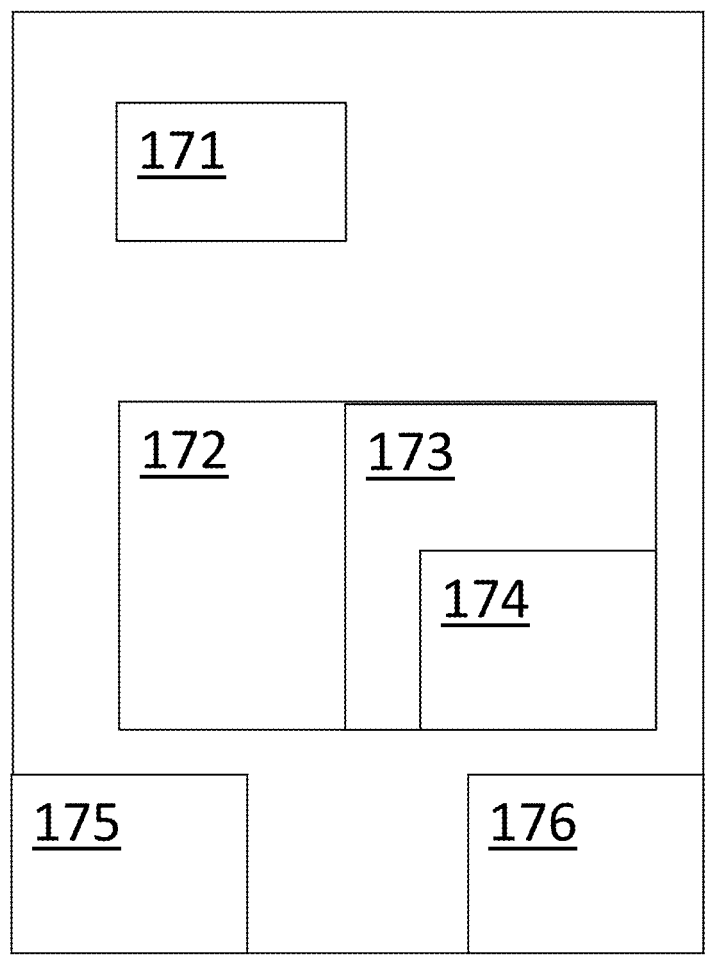
FIG. 2 illustrates a controller according to an embodiment of the present invention.

As mentioned above, the material testing apparatus 100 comprises the controller 170 which is illustrated in detail in FIG. 2. The controller 170 is arranged to control the electric machine 302 using outputs in the form of control signals. In particular, the controller 170 is arranged to transmit control signals to configure the electric machine 302 of the crosshead drive mechanism 180 into the driving configuration and the braking configuration as will be described below.

The controller 170 is arranged to selectively configure the electric machine 302 of the crosshead drive mechanism 180 into the driving configuration shown in FIG. 3a. The electric machine 302 may be configured into the driving configuration by controlling the switching device 303 into an open position.

The controller 170 is arranged to control the crosshead drive mechanism 180 to move the crosshead 150 generally vertically about the guide 110. The controller 170 may transmit control signals to the crosshead drive mechanism 180 which cause the electric machine 302 to operate as an electric motor to actively drive the crosshead 150 up or down the guide 110 via the ball screw mechanism.

The controller 170 is arranged to configure the electric machine 302 of the crosshead drive mechanism 180 into the braking configuration as shown in FIG. 3b. The electric machine 302 may be configured into the braking configuration by controlling the switching device 303 into a closed position.

In some embodiments, the controller 170 may be arranged to configure the electric machine 302 into the braking configuration after controlling the crosshead drive mechanism 180 to vertically move the crosshead 150. In such an embodiment, the controller 170 may perform the crosshead drive operation as described above, and once the crosshead drive mechanism 180 is no longer moving the crosshead 150, the controller 170 may configure the electric machine 302 from the driving configuration to the braking configuration by moving the switching device 303 from the open position to the closed position. Advantageously, since backdrive may occur when the crosshead drive mechanism 180 is not actively driving the crosshead 150, configuring the electric machine 302 into the braking configuration when the crosshead drive operation is not being performed reduces the possibility of backdrive.

In some embodiments, the controller 170 may be arranged to configure the electric machine 302 into the braking configuration immediately after controlling the crosshead drive mechanism 180 to complete vertical movement of the crosshead 150. As a result, there is substantially no delay between the completion of the crosshead drive operation and configuration of the electric machine 302 into the braking configuration. Advantageously, immediately configuring the electric machine 302 into the braking configuration when the crosshead drive operation is completed reduces the amount of time during which backdrive may occur.

As shown in FIG. 2, the controller 170 may be implemented by a processor 171 and a memory 172 including a computer program 173 comprising computer program instructions 174. The processor 171 may comprise an output interface 175 via which data and/or commands in the form of control signals are output by the processor and an input interface 176 via which data and/or commands are input to the processor. Implementation of the controller 170 can be in hardware alone (a circuit), have certain aspects in software including firmware alone or can be a combination of hardware and software (including firmware). The computer program 173 may be stored on a computer readable storage medium (disk, memory etc). The computer program 173 may be computer software which, when executed, is arranged to perform a method according to the method described below in relation to FIG. 6 or 7.

Referring back to FIG. 1, the material testing apparatus 100 comprises a sample test means 120 which may be a sample test apparatus. The sample test apparatus 120 is for holding the sample 130 and applying a test force to the sample 130. The sample test apparatus 120 may comprise a sample holding device 120a for holding the sample 130 and a force apparatus 120b for applying the test force to the sample 130. The crosshead 150 is arranged to support at least a portion of the sample test apparatus 120. Advantageously, using the crosshead 150 as a support for other components of the material testing apparatus 100 results in a compact apparatus.

In the embodiment illustrated in FIG. 1, the force apparatus 120b is supported by the crosshead 150 in that the force apparatus 120b is located on the crosshead 150. Furthermore, an upper part of the sample holding device 120a is supported by the crosshead 150 in that in some embodiments the upper part is suspended below the crosshead 150. The crosshead 150 may be adapted according to force requirements and/or a shape and size of the material testing apparatus 100.

Therefore, in the crosshead drive operation, the crosshead 150 is moved such as lifted to allow the sample 130 to be inserted or removed from the material testing apparatus 100 and to accommodate samples of different sizes to be tested. The movement of the crosshead 150 about the guide 110 enables a position of the sample holding device 120a to be adjusted in dependence on the size of the sample 130.

The sample holding device 120a may be arranged to grip the sample 130 and may be comprised of a plurality of members, such that the sample 130 is gripped when placed between members of the sample holding device 120a. For example, the sample holding device 120a may comprise a plurality of grips, such as claws, each arranged at opposing ends of the sample 130. In some embodiments, there is a pair of grips.

The sample holding device 120a may be configured to withstand a maximum force to be applied to the sample by the material testing apparatus 100. As such, the sample holding device 120a may be structured and formed of a material such that the sample holding device 120a is not deformed by a force less than or equal to the maximum force to be applied to the sample 130. The sample holding device 120a may therefore be adapted according to force requirements and/or a shape and size of the sample 130 to be tested. The sampling holding means 120a may be arranged horizontally or vertically in dependence on a type and amount of force to be applied to the sample. However, it will be appreciated that other structures and forms of sample holding device will be envisaged.

The force apparatus 120b is for applying force to the sample 130 which may be to test physical properties of the sample 130. The force apparatus 120b may repeatedly apply force to the sample 130. For example, the force apparatus 120b may apply a deformation or testing force to the deform the sample 130, by one or more of stretching, compression or torsion could be applied instead of or in addition to the deformation force. The force apparatus 120b may apply the force via the sample holding device 120a in that a force to be applied to the sample 130 is applied by moving the sample holding device 120a. The force apparatus 120b may be arranged to apply the force to one end of the sample 130 or two opposing ends of the sample 130. The force apparatus 120b may be adapted according to force requirements and/or a shape and size of the material testing apparatus 100. For example, the force apparatus 120b may comprise an actuator. The actuator may be arranged to, in use, move at least one portion of the sample holding device to apply force to the sample held therein. However, it will be appreciated that other force apparatus to apply a force will be envisaged.

The material testing apparatus 100 of some embodiments may comprise an electric clamping means 160. The electric clamping means 160 may be an electric clamping apparatus. The electric clamping apparatus 160 is arranged to, in use, selectively apply a releasable clamping force to the guide 110 to secure the crosshead 150 at a location with respect to the guide 110. The electric clamping apparatus 160 is described in more detail below in relation to electric clamping apparatus 560 of FIG. 5.

The controller 170 may be arranged to control the electric clamping apparatus 160 to apply the clamping force to the guide 110. The controller 170 may transmit a control signal to the electric clamping means 160 to apply the clamping force to the guide 110. The clamping force reduces the possibility of backdrive of the crosshead 150 occurring because it secures the crosshead 150 to the guide 110. Therefore, there is a period in between the crosshead drive operation and application of the clamping force when the crosshead 150 may cause backdrive.

The controller 170 may be arranged to configure the electric machine 302 into the braking configuration after controlling the crosshead drive mechanism 180 to vertically move the crosshead 150 prior to applying the clamping force to the guide 110. Advantageously, configuring the electric machine into the braking configuration during the period between the crosshead drive operation and application of the clamping force reduces the amount of time during which backdrive may occur.

FIG. 4 illustrates a cross section of the crosshead drive mechanism 180 according to an embodiment of the present invention. As previously mentioned, the crosshead drive mechanism 180 may comprise a combination of electrical and mechanical components arranged in such a way as to move the crosshead 150 vertically about the guide 110. In the embodiment illustrated in FIG. 4, the crosshead drive mechanism 180 comprises the electric machine 302 and a mechanical driving mechanism arranged to cause generally linear motion of the crosshead 150 vertically with respect to the guide 110.

The mechanical driving mechanism may be comprised of multiple mechanical components. In the embodiment illustrated in FIG. 4, the mechanical driving mechanism comprises the ball screw mechanism arranged to cause linear motion of the crosshead 150 about the guide 110. In particular, the ball screw mechanism may translate rotational motion of the electric machine 302 to the linear motion of the crosshead 150 about the guide 110.

The ball screw mechanism comprises at least one ball screw 401 and at least one ball screw nut 402. The ball screw mechanism may comprise at least one ball screw 401 positioned vertically aligned with the guide 110 and located substantially near to the guide 110. The ball screw 401 may be fixed in position such that it does not rotate. The electric machine 302 causes rotation of a belt 404 which in turn rotates a pulley 403. The pulley 403 may be supported on the crosshead 150 and orientated perpendicular to the guide 110. The pulley 403 may rotate due to motion of the belt 404 to drive the ball screw nut 402 vertically about the ball screw 401. As a result of the vertical linear motion of the ball screw nut 402 about the ball screw 401, the crosshead 150, which is attached to the ball screw nut 402, may be driven vertically about the guide 110. It will be appreciated that, other mechanical arrangements of the crosshead drive mechanism 180 may be envisaged. For example, a rotating screw may be used in the crosshead drive mechanism 180.

Although FIG. 4 illustrates one of each of the ball screw 401, the ball screw nut 402, the pulley 403 and the belt 404, it will be appreciated that the crosshead drive mechanism 180 may comprise more than one of some or all of the above components. For example, when the guide 110 comprises two stanchions as illustrated in FIG. 1, the crosshead drive mechanism 180 may comprise two ball screws, where each ball screw is positioned vertically aligned with a stanchion and located substantially near to the respective stanchion. In such an embodiment, the crosshead drive mechanism 180 may also comprises a ball screw nut, a pulley and a belt for each ball screw to cause vertical motion of the crosshead 150 about the guide 110.

Figure 5:
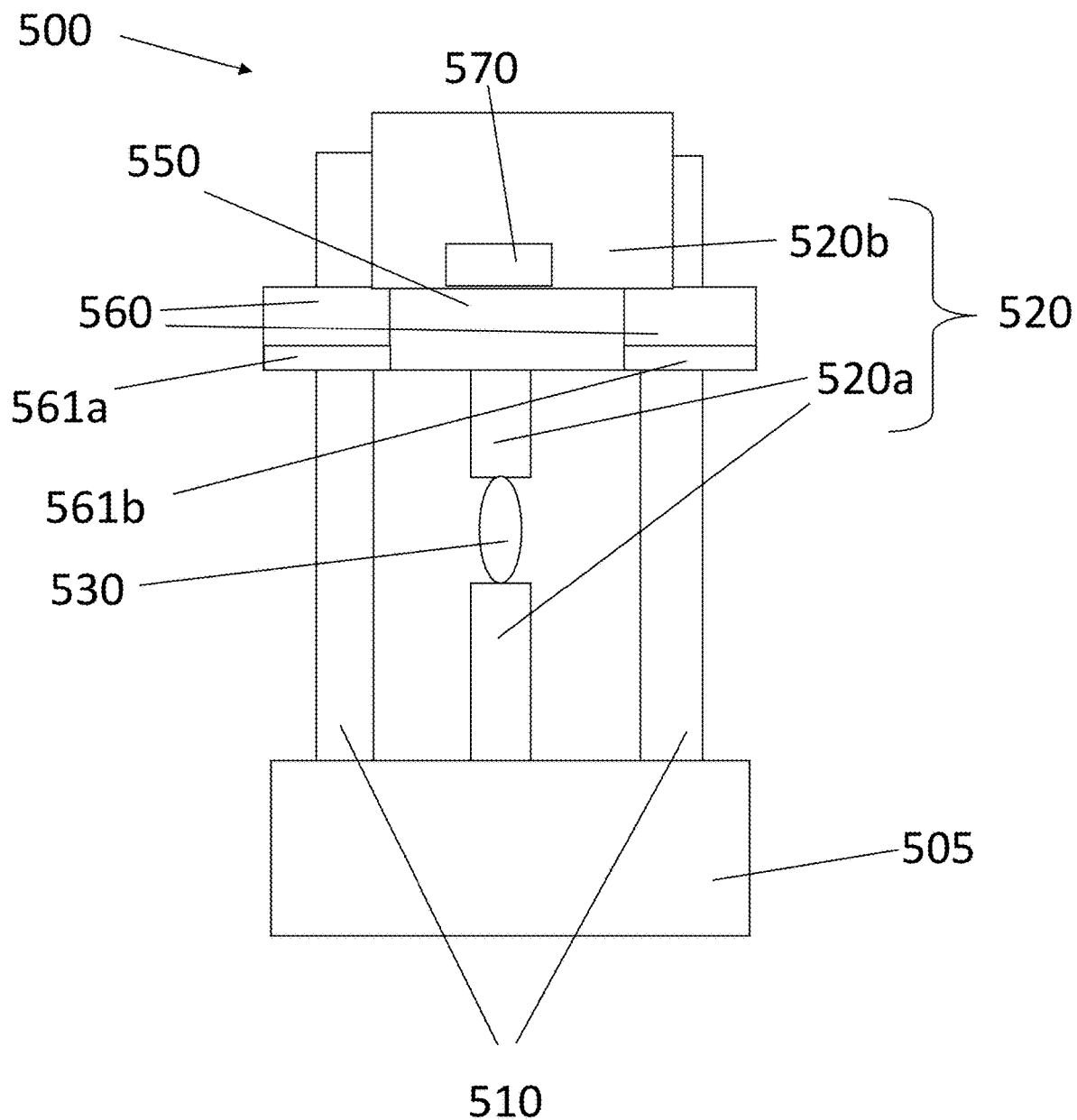
FIG. 5 is an apparatus according to an embodiment of the present invention.

FIG. 5 illustrates a material testing apparatus according to an embodiment of the present invention, indicated generally by reference numeral 500. The material testing apparatus 500 may be configured to perform a method according to an embodiment of the invention as described below in relation to FIG. 7. The material testing apparatus 500 shown in FIG. 5 may comprise like parts to the embodiments described above, unless otherwise described, and for clarity repeat description thereof will be omitted.

The material testing apparatus 500 may comprise all of the components of the material testing apparatus 100 illustrated in FIG. 1, except for the crosshead drive mechanism 180. In particular, the material testing apparatus 500 comprises a guide 510 and a crosshead 550.

The guide 110 and the crosshead 550 may correspond to the guide 110 and the crosshead 150 of FIG. 1, respectively. The guide 510 is arranged to support the crosshead 550 and guide a movement of the crosshead 550 about the guide 510. The guide 510 may be supported by a base 505 of the material testing apparatus 500. The crosshead 550 is vertically moveable about the guide 510 and is arranged to move about the guide 510 in the same way as described for material testing apparatus 100 of FIG. 1. The crosshead 550 may be manually moved vertically about the guide 510 by a user using a handle or lever or may be moved electronically.

The material testing apparatus 500 comprises a sample test apparatus 520 comprising a sample holding device 520a and a force apparatus 520b, at least a portion of which are supported on the crosshead 550. The sample holding device 520a and the force apparatus 520b may correspond to the sample holding device 120a and the force apparatus 120b of FIG. 1 respectively.

The material testing apparatus 500 comprises electric clamping means 560. The electric clamping means 560 may be an electric clamping apparatus. The electric clamping apparatus 560 is configured to apply a releasable clamping force to the guide 510 to secure the crosshead 550 at a location with respect to the guide 510. The electric clamping apparatus 560 may comprise a combination of electrical and mechanical components arranged in such a way as to apply the clamping force.

The electric clamping apparatus 560 may comprise at least one clamping member 561, 561b arranged to apply the releasable clamping force. The at least one clamping member 561a, 561b may be at least partially moveable and arranged to contact the guide 510. As a result of the contact between the at least one clamping member 561a, 561b and the guide 510, the clamping force may be a friction force between the at least one clamping member 561a, 561b and the guide 510. The friction force may be increased as a contact surface area between the at least one clamping member 561a, 561b and the guide 510 increases.

The electric clamping apparatus 560 may be user controlled. That is, the electric clamping apparatus 560 may secure the crosshead 550 to the guide 510 without manual application of the clamping force but may require user interaction to initiate application of the clamping force. For example, a user may be required to push a button to initiate application of the clamping force.

Alternatively, or in addition, the electric clamping means 560 may be automated clamping means. As will be understood by the term "automated", the automated clamping apparatus may be configured to automatically apply the releasable clamping force to the guide 510. That is, the automated clamping apparatus secures the crosshead 550 to the guide 510 without manual application of the clamping force or user interaction to control application of the clamping force.

The electric clamping apparatus 560 is driven by an electric machine, such as the electric machine 302 illustrated in FIGS. 3a and 3b. The electric machine of the electric clamping apparatus 560 may be capable of being configured into the same configurations shown in FIGS. 3a and 3b.

However, the driving configuration of the electric machine 302 illustrated in FIG. 3a may be referred to as a clamping configuration when installed in the electric clamping apparatus 560. That is, when the electric machine of the electric clamping apparatus 560 is configured as shown in FIG. 3a, power is provided to the electric machine to cause the electric machine to actively drive the electric clamping apparatus 560 to apply or release the clamping force.

The braking configuration of the electric machine 302 illustrated in FIG. 3b may directly correspond to the braking configuration of the electric clamping apparatus 560.

The electric clamping apparatus 560 may comprise a ball screw mechanism. The electric machine of the electric clamping apparatus 560 causes rotation of mechanical components within the electric clamping apparatus 560 which in turn cause linear motion of a ball screw nut about a ball screw. As a result of the linear motion of the ball screw nut about the ball screw, the electric clamping apparatus 560 is driven which causes the at least one clamping member 561a, 561b to be moved towards the guide 510 to apply the clamping force to the guide 510.

However, when the electric clamping apparatus 560 is not being actively driven by electric machine, tension in the electric clamping apparatus 560 may cause backdrive. This may result in an unintentional release of the clamping force, which in turn means that the crosshead 550 is not secured to the guide 510. In this situation, the crosshead 550 may move under gravity and this uncontrolled motion of the crosshead 550 could cause harm to the user of the material testing apparatus 500 or damage to the sample 530.

The material testing apparatus 500 comprises a controller 570, which may have the same implementation as the controller 170 illustrated in FIG. 2. The controller 570 is arranged to control the electric machine of the electric clamping apparatus 560 using outputs in the form of control signals. In particular, the controller 570 is arranged to transmit control signals to configure the electric machine of the electric clamping apparatus 560 into the clamping configuration and the braking configuration.

The controller 570 is arranged to selectively configure the electric machine of the electric clamping apparatus 560 into the clamping configuration shown in FIG. 3a. The electric machine may be configured into the clamping configuration by controlling switching device 303 into an open position. In the clamping configuration power is provided to the electric machine to actively move the at least one clamping member 561a, 561b to apply the clamping force.

The controller 570 is arranged to control the electric clamping apparatus 560 to apply the clamping force to the guide 510. The controller 570 may transmit control signals to the electric clamping apparatus 560 which cause the electric machine to actively drive the at least one clamping member 561a, 561b to apply the clamping force.

The controller 570 is arranged to configure the electric machine of the electric clamping apparatus 560 into the braking configuration shown in FIG. 3b.

The electric machine may be configured into the braking configuration by controlling the switching device 303 into the closed position. The controller 570 may transmit control signals to configure the electric machine of the electric clamping apparatus 560 in an arrangement that connects the winding of the electric machine using the low resistance connection. The low resistance connection of the winding of the electric machine may comprise connecting at least one winding of the electric machine through a connection of substantially zero resistance.

Advantageously, configuring the electric machine of the electric clamping apparatus 560 into the braking configuration reduces the possibility of unintentional release of the clamping force which may result in uncontrolled movement of the crosshead 150.

The controller 570 may arranged the electric machine of the electric clamping apparatus 560 in either the clamping configuration or the braking configuration by controlling the switching device 303 to either the open or closed position as described above.

In some embodiments, the controller 570 may be arranged to configure the electric machine into the braking configuration when the clamping force is applied to the guide 510. Advantageously, configuring the electric machine into the braking configuration when the clamping force is being applied to the guide 510 reduces the possibility of unintentional release of the clamping force which could lead to uncontrolled movement of the crosshead 550.

In some embodiments, the controller 570 may be arranged to configure the electric machine into the braking configuration immediately after the clamping force is applied. As a result, there is substantially no delay between the completion of the driving of the electric clamping apparatus 560 to apply the clamping force and the configuration of the electric machine into the braking configuration. Advantageously, immediately configuring the electric machine into the braking configuration when the driving of the electric clamping apparatus 560 to apply the clamping force is complete reduces the amount of time during which unintentional release of the clamping force, which can lead to uncontrolled movement of the crosshead, may occur.

As previously mentioned, material testing apparatus 500 does not comprise a crosshead drive means. However, in some embodiments of the present invention, the material testing apparatus 500 illustrated in FIG. 5 may comprise the crosshead drive mechanism 180 of the material testing apparatus 100 illustrated in FIG. 1.

Figure 6:
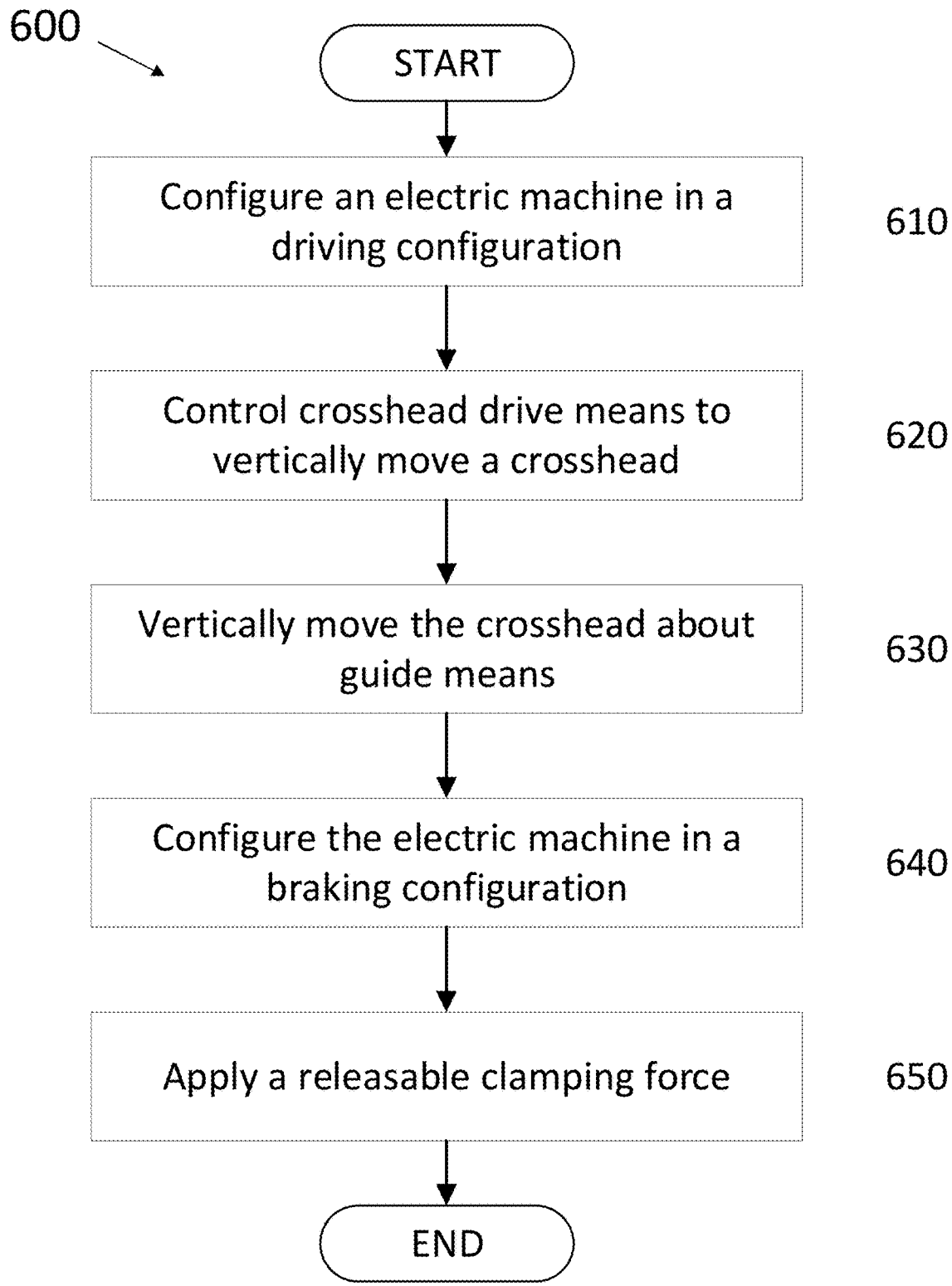
FIG. 6 illustrates a flowchart of a method according to an embodiment of the present invention.

FIG. 6 illustrates a flowchart of a method 600 according to an embodiment of the invention. The method 600 may be performed by the material testing apparatus 100 described above and illustrated in FIGS. 1-4.

The method 600 comprises configuring 510 the electric machine 302 of the crosshead drive mechanism 180 into the driving configuration as shown in FIG. 3a. Method step 620 comprises controlling the crosshead drive mechanism 180 to move the crosshead 150 generally vertically about the guide 150.

The method 600 comprises vertically moving 630 the crosshead 150 about the guide 150 using the electric machine 302 of the crosshead drive mechanism 180.

The method 600 comprises configuring 640 the electric machine 302 of the crosshead drive mechanism 180 into the braking configuration. As discussed above, in the braking configuration a winding of the electric machine is connected together with a low resistance as shown in FIG. 3b. When the electric machine of the crosshead drive mechanism 180 is configured into the braking configuration, the low resistance connection may comprise shorting a winding of the electric machine through a connection of substantially zero resistance In some embodiments, method step 640 may comprise configuring the electric machine 302 to configure into the braking configuration after controlling the crosshead drive mechanism 180 to vertically move the crosshead 150.

Furthermore, method step 640 may comprise configuring the electric machine 302 into the braking configuration immediately after controlling the crosshead drive mechanism to complete vertical movement of the crosshead 150.

The method 600 may comprise applying 650 a releasable clamping force to the guide 110 to secure the crosshead 150 at a location with respect to the guide 110 using the electric clamping means 160. Method step 650 may include controlling, by the controller 170, the electric clamping apparatus 160 to apply the clamping force.

Method 600 may comprise controlling the electric machine to configure into the braking configuration after controlling the crosshead drive mechanism 180 to vertically move the crosshead 150 prior to applying the clamping force to the guide 110.

Figure 7:
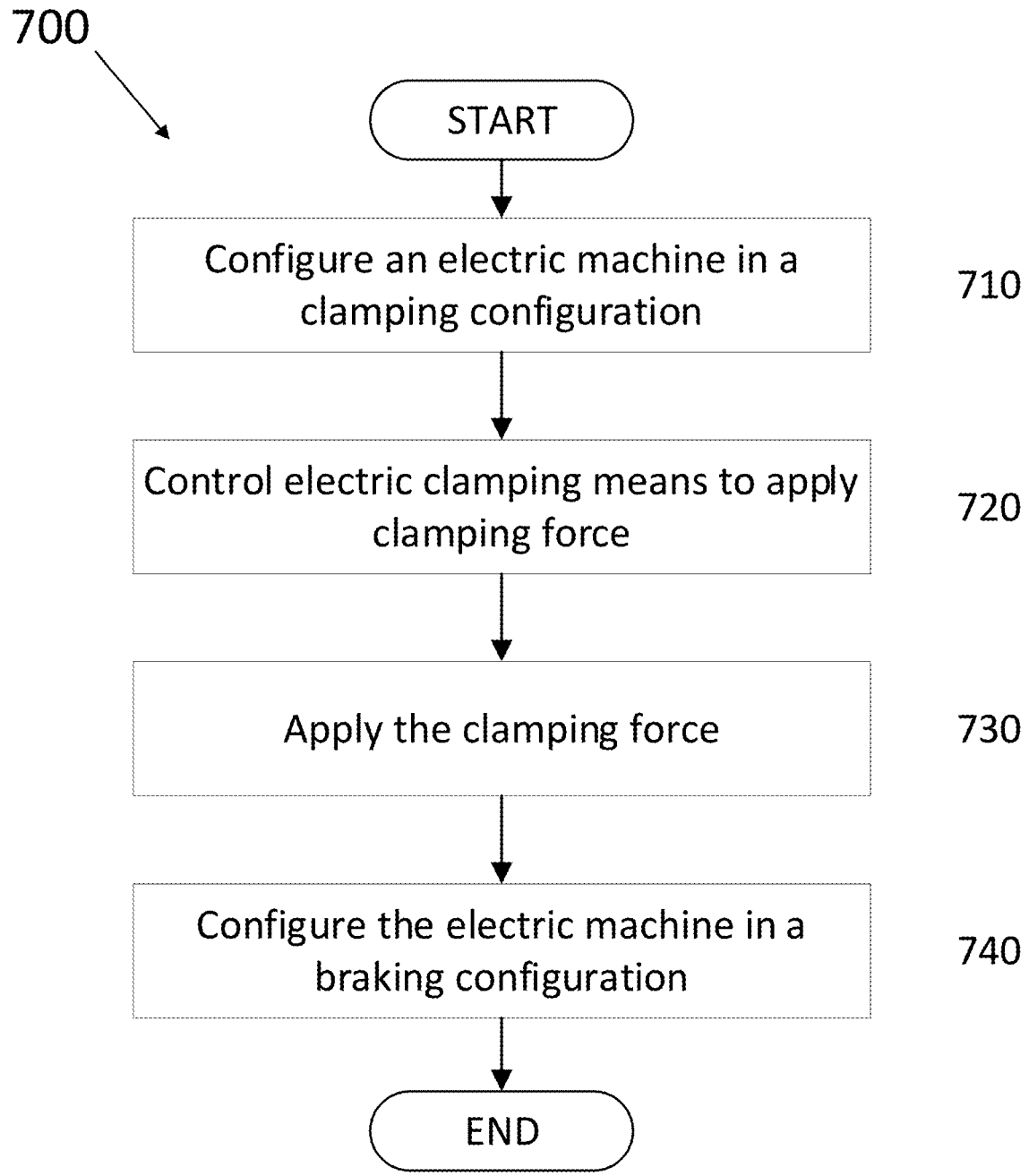
FIG. 7 illustrates a flowchart of a method according to an embodiment of the present invention.

FIG. 7 illustrates a flowchart of a method 700 according to an embodiment of the invention. The method 700 may be performed by the material testing apparatus 700 described above and illustrated in FIG. 5.

The method 700 comprises configuring 710 the electric machine of the electric clamping apparatus 560 into the clamping configuration as shown in FIG. 3a. Method step 720 comprises controlling the electric clamping apparatus 560 to apply the clamping force.

The method 700 comprises applying 730 the clamping force, using the electric clamping apparatus 560, to the guide 510 to secure the crosshead 550 at a location with respect to the guide 510.

The method 700 comprises configuring 740 the electric machine of the electric clamping apparatus 560 into a braking configuration as shown in FIG. 3b. As discussed above, in the braking configuration a winding of the electric machine is connected together with a low resistance. When the electric machine of the electric clamping apparatus 560 is configured into the braking configuration, the low resistance connection may comprise shorting a winding of the electric machine through a connection of substantially zero resistance In some embodiments, method step 740 may comprise controlling the electric machine to configure into the braking configuration when the clamping force is applied to the guide 510.

Furthermore, method step 740 may comprise configuring the electric machine into the braking configuration immediately after the clamping force is applied.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A material testing apparatus, comprising: a guide, a sample holding device for holding a sample; a force apparatus for applying a test force to the sample; configured to support at least a portion of the sample holding device, wherein a crosshead is moveable along the guide; a crosshead drive mechanism for moving the crosshead generally vertically along the guide, wherein the crosshead drive mechanism is driven by an electric machine in a driving configuration; and a controller configured to: configure the electric machine into the driving configuration; control the crosshead drive to move the crosshead generally vertically about the guide; and configure the electric machine into a braking configuration, wherein in the braking configuration a winding of the electric machine is shorted with a low resistance connection.

2. The apparatus of claim 1, wherein the controller is configured to configure the electric machine into the braking configuration after controlling the crosshead drive to vertically move the crosshead.

3. The apparatus of claim 2, wherein the controller is configured to configure the electric machine into the braking configuration immediately after controlling the crosshead drive to complete vertical movement of the crosshead.

4. The apparatus of claim 1, wherein one or both of:
in the braking configuration, the low resistance connection comprises connecting a winding of the electric machine through a connection of substantially zero resistance; and
the controller configures the electric machine into the driving configuration or the braking configuration by controlling a switching device.

5. The apparatus of claim 1, comprising an electric clamp configured to apply a releasable clamping force to the guide to secure the crosshead at a location with respect to the guide and wherein the controller is configured to control the electric clamp to apply the clamping force.

6. The apparatus of claim 5, wherein the controller is configured to configure the electric machine into the braking configuration after controlling the crosshead drive to vertically move the crosshead prior to applying the clamping force to the guide.

7. The apparatus of claim 1, wherein the crosshead drive comprises a driving mechanism arranged to cause generally linear motion of the crosshead vertically with respect to the guide means.

8. The apparatus of claim 7, wherein the driving mechanism arranged to cause linear motion of the crosshead about the guide comprises a ball screw mechanism arranged cause the linear motion of the crosshead about the guide.

9. A material testing apparatus, comprising:
a guide,
a sample holding device for holding a sample;
a force apparatus for applying a test force to the sample;
a crosshead configured to support at least a portion of the sample holding device, wherein the crosshead is moveable along the guide;
an electric clamp configured to apply a releasable clamping force to the guide to secure the crosshead at a location with respect to the guide, wherein the electric clamp is driven by an electric machine in a clamping configuration; and
a controller configured to:
configure the electric clamp into the clamping configuration;
control the electric clamp to apply the clamping force to the guide; and
configure the electric machine into a braking configuration, wherein in the braking configuration a winding of the electric machine is shorted with a low resistance connection.

10. The apparatus of claim 9, wherein the controller is configured to configure the electric machine into the braking configuration when the clamping force is applied to the guide.

11. The apparatus of claim 10, wherein the controller is configured to configure the electric machine into the braking configuration immediately after the clamping force is applied.

12. The apparatus of claim 9, wherein one or both of:
in the braking configuration, the low resistance connection comprises connecting a winding of the electric machine through a connection of substantially zero resistance; and
the controller configures the electric machine into the clamping configuration or the braking configuration by controlling a switching device.

13. A method of operating a material testing apparatus, wherein the material testing apparatus comprises:
a guide,
a sample holding device for holding a sample;
a force apparatus for applying a test force to the sample;
a crosshead configured to support at least a portion of the sample holding device, wherein the crosshead is moveable along the guide;
a crosshead drive mechanism for moving the crosshead generally vertically along the guide, wherein the crosshead drive mechanism is driven by an electric machine in a driving configuration; and wherein the method comprises:
  configuring the electric machine into the driving configuration;
  controlling the crosshead drive mechanism to move the crosshead generally vertically along the guide;
  vertically moving the crosshead along the guide using the electric machine;
  configuring the electric machine into a braking configuration, wherein in the braking configuration a winding of the electric machine is shorted with a low resistance connection.

14. A computer readable storage device comprising computer readable instructions which, when executed, cause a processor to perform the method of claim 13.

\* \* \* \* \*